Aug. 1, 1933.  O. CULLMAN  1,920,498
MEANS FOR MOUNTING ELECTRICALLY ACTUATED MECHANISMS
FOR DRIVING LATHES AND OTHER MACHINES
Filed Oct. 27, 1930  3 Sheets-Sheet 2
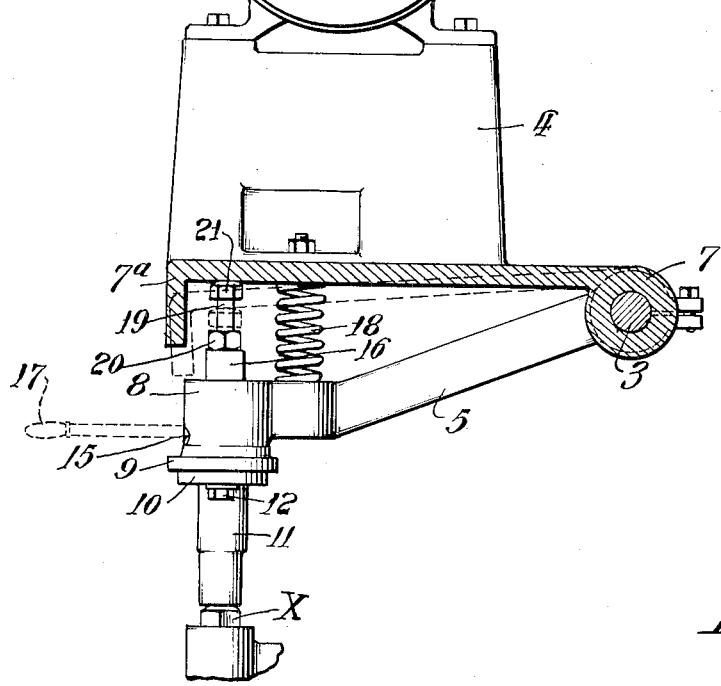
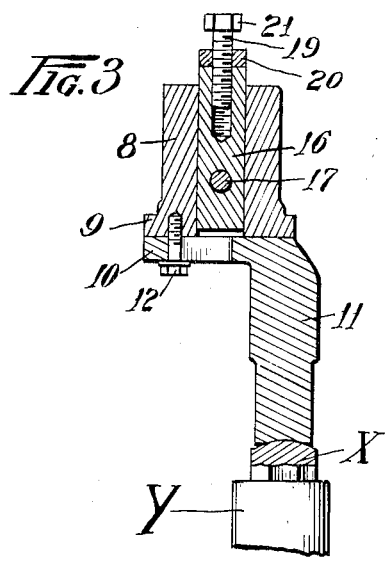
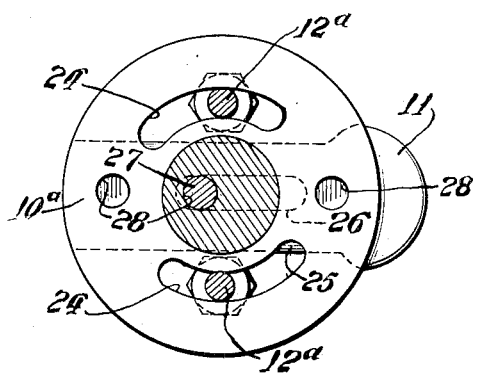
Inventor:
Otto Cullman,
By: Charles Turner Brown
Atty.

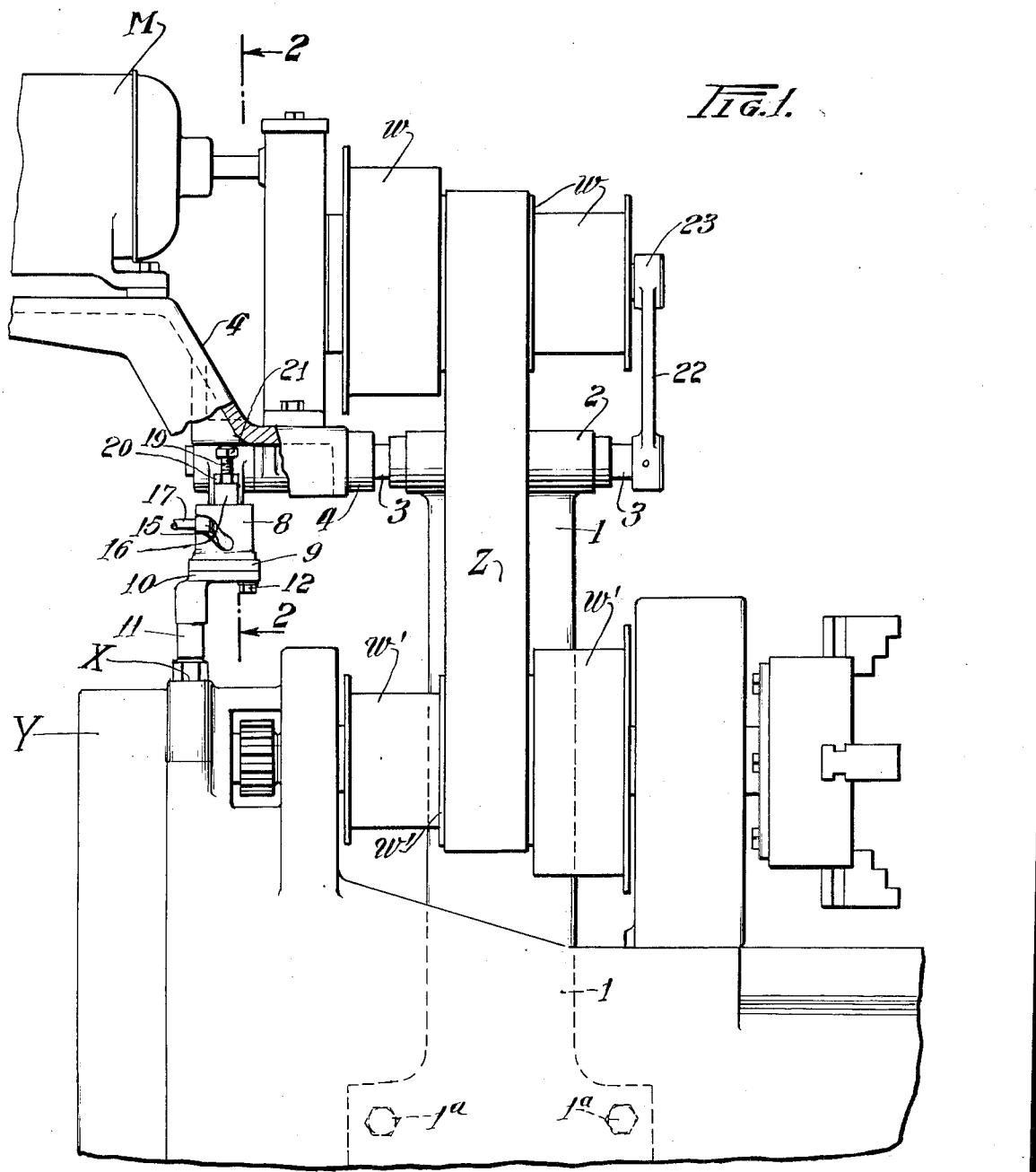

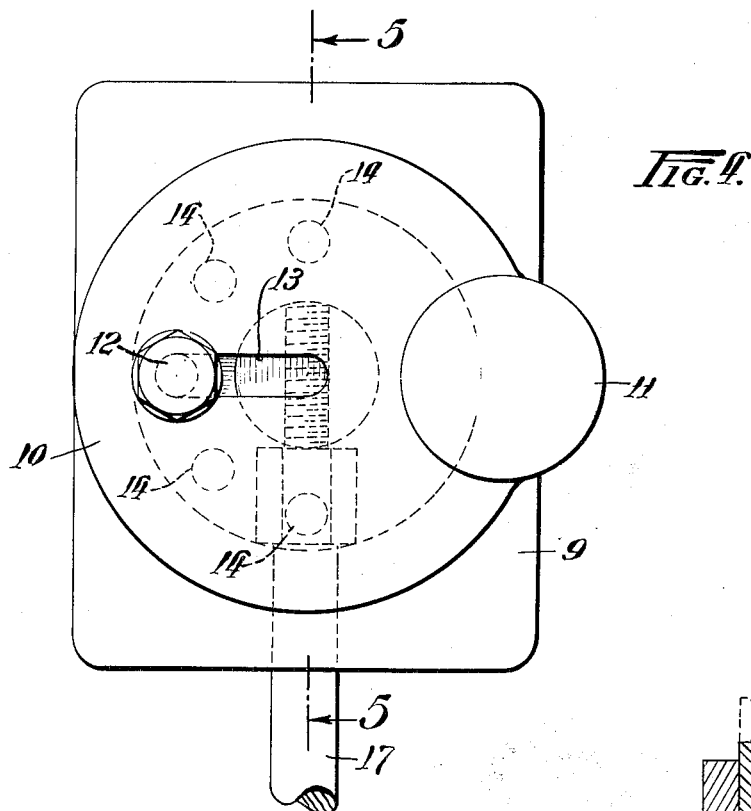
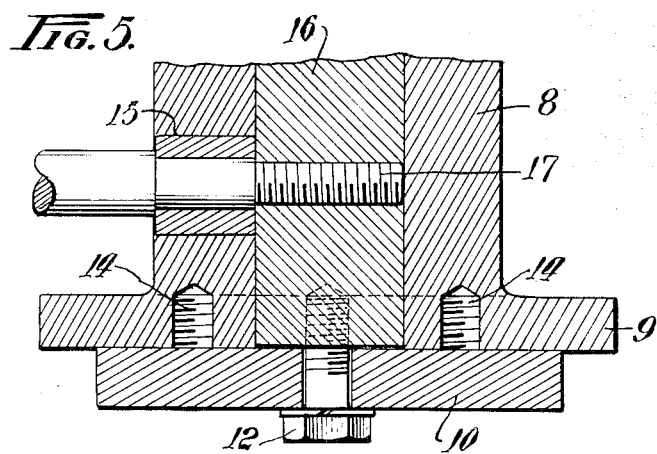
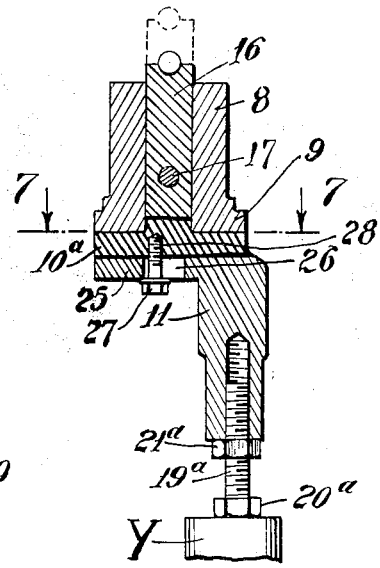

Patented Aug. 1, 1933

1,920,498

UNITED STATES PATENT OFFICE 1,920,498

MEANS FOR MOUNTING ELECTRICALLY ACTUATED MECHANISMS FOR DRIVING LATHES AND OTHER MACHINES

Otto Cullman, Chicago, Ill.

Application October 27, 1930. Serial No. 491,631

12 Claims. (Cl. 308—11)

This invention relates to means for mounting electrically actuated mechanisms for driving lathes and other machines. The mechanisms herein illustrated and disclosed are mounted on a lathe.

Among the objects of the invention is to obtain means for mounting electric motors and mechanisms actuated thereby for driving lathes and other machines which are readily attached to said lathes and other machines, and which are so constructed that a given size of said mounting means may be attached to a plurality of sizes of lathes or other machines without requiring adjustment other than that which is afforded by the construction embodied in said means. An additional object is to obtain means for mounting an electric motor and mechanisms actuated thereby which may be mounted on and adjusted to lathes and other like machines and which when attached and adjusted will be compact, sightly, and will so relate to the construction and design of said lathe or other machine as to be in conformity with the same, and present a unitary appearance, as if said lathe or other machine and said construction were included in an original design and not a lathe or other machine provided with an addition thereto. An additional object is to obtain means of the kind named which are well adapted for the purpose described which is simple in construction, durable in operation, easily understood and readily and speedily attachable to and adjustable on a lathe or other machine, and which when so mounted and adjusted can be quickly manipulated by the operator of said lathe or other machine without any considerable exertion by said operator.

In the drawings referred to Fig. 1 is a front elevation of a construction embodying this invention and of one end of a lathe on which said construction is mounted. Fig. 2 is a vertical section of the construction embodying the invention, taken on line 2—2 of Fig. 1, viewed as indicated by arrows. Fig. 3 is a vertical section on an enlarged scale, of the vertical member which forms an adjustable foot at one end of a supporting member, said supporting member being, preferably, pivotally mounted at its opposite end on a rotatably mounted horizontal shaft, rod or bar. Fig. 4 is a bottom plan view, looking up, of the adjustable foot illustrated in Fig. 3. Fig. 5 is a vertical section of the foot illustrated in Figs. 3 and 4, taken on line 5—5 of Fig. 4, viewed as indicated by arrows. Fig. 6 is a vertical section of a modification of the adjustable foot illustrated in Figs. 3, 4 and 5. And Fig. 7 is a top plan view, on a further enlarged scale, of the adjustable foot which is illustrated in Fig. 6, taken on line 7—7 of said Fig. 6, viewed as indicated by arrows.

A reference character applied to designate a given part indicates said part throughout the several figures of the drawings, wherever the same appears.

1 represents a standard which is rigidly attached at its lower end, as by bolts 1ª, to a lathe or other machine on which the construction is mounted. 2 represents a horizontal journal bearing at the upper end of standard 1. 3 represents a shaft, rod or bar, which is mounted to turn or rock in bearing 2 in a horizontal plane. 4 represents a table or base one side of which is rigidly secured on shaft, rod or bar 3. 5 represents a bar which, at one end thereof, is loosely mounted on shaft, bar or rod 3, and at the other end is supported by means about to be described on the lathe or other machine on which the construction embodying this invention is mounted. This bar forms a base on which the side 7ª of table 4 is supported. 8 represents a vertical bearing or standard which is illustrated as mounted thereon and integral therewith, at one end of base 5, and 9 represents the lower end or bottom of vertical bearing 8. 10 represents the base of a member 11, which I term a foot, which is adjustably secured to bottom 9 by bolt 12. Base 10 is provided with slot 13, (see Fig. 4) through which the bolt 12 extends and the bottom 9 is provided with a plurality of apertures, 14, each of which permits bolt 12 to extend therethrough; the one thereof through which said bolt extends being determined by the requirements of the adjustment of said foot 11. The bolt 12 is turned to place to secure the base 10 to bottom 9, after the required adjustment is made, said adjustment being illustrated in Fig. 3 as made so that the lower end of foot 11 rests on the head of bolt X of member Y of the lathe or other machine on which the construction is illustrated as mounted, (see also, Fig. 1). 15 represents a diagonally extending slot or runway in vertical bearing 8. 16 represents a longitudinally movable member mounted in vertical bearing 8, and 17 represents a handle which extends through slot 15 and is rigidly secured in member 16. Member 16 is longitudinally moved in bearing 8 by moving handle 17 in slot 15. 18 represents a coiled spring the lower end of which is seated on bar or base 5 and the upper end of which abuts against the under side of table 4. The purpose of spring 18 is to partially support the front side of table 4 when, by moving handle 17 to the lower end of slot 15, the table 4 is lowered on the front side 7ᵃ thereof, to loosen belt Z, (Fig. 1) for the purpose of shifting it from one driving pulley W of the mechanism mounted on the table 4 and a driven pulley W¹, of the lathe or other machine on which the construction is mounted.

To control the tautening of belt Z, I illustrate screw threaded bolt 19 in the upper end of longitudinally movable member 16, with set nut 20 thereon, said set nut holding bolt 19 rigidly in place in an adjusted position. 21 represents the head of bolt 19, on which head the side of table 4 opposite to the side which is supported by horizontal shaft, bar or member 3, rests and by which said opposite side is supported. 22 represents a bar which forms a member co-acting with the mechanisms mounted on the table 4, and is rigidly mounted on shaft, rod or bar 3, and 23 represents a journal bearing at the opposite and upper end of bar 22, in which bearing one end of a shaft driven by the mechanisms which are mounted on table 4, is rotatably mounted.

In the modification which is illustrated in Figs. 6 and 7, the base 10 is provided with circular extending slots 24, through which bolts 12ᵃ extend into a screw threaded aperture 14 in the lower end of bottom 9, and the leg 11 is provided with a disk base 25, and said disk is provided with slot 26. 27 represents a bolt which extends through slot 26 and into the screw threaded aperture 28 in disk 10ᵃ.

By means of the several members last above described the required adjustment of foot 11 is obtained.

In this modification, also, I have illustrated belt tautening mechanism at the lower end of foot or member 11; said mechanism comprising the bolt 19ᵃ, set nut 20ᵃ thereon and head 21ᵃ on said bolt, said head resting on and supported by member Y of the lathe or other machine on which the construction embodying this invention is mounted. The last above belt tautening means are substituted for bolt 19, set nut 20 and head 21 of said bolt, when used.

It will be observed that table 4 has a plurality of horizontal faces, or surfaces, in different planes. This is to avoid extended supports, or legs being required between the base of motor M mounted on said table and said table, said motor forming a member of mechanisms which may be mounted on the table.

I claim:

1. A rigidly mounted standard, a bearing on said standard, a bar horizontally supported in said bearing, and a table, one side of said table rigidly mounted on said bar, in combination with a member loosely mounted on said bar, an additional member secured on the under side of said loosely mounted member, and an adjustable foot thereon, a standard on said loosely mounted member, a longitudinally movable member in said last named standard, means to limit the longitudinal movement of said movable member, adjustable belt tautening means on said longitudinally movable member interposed between it and said table, to support one side of said table, and a spring member interposed between said loosely mounted member and said table.

2. A standard rigidly mounted on a machine, a bearing on said standard, a member horizontally supported by said bearing, and a table, one side of said table rigidly mounted on said horizontally supported member, an additional member rigidly mounted on said horizontally supported member and a journal bearing on said additional member, in combination with a base member loosely mounted at one end thereof on said horizontally supported member, and a member on the under side of said loosely mounted base member, an additional standard on said loosely mounted member, a longitudinally movable member in said additional standard, adjustable belt tautening means interposed between said machine and said table, and a spring member interposed between said loosely mounted base member and said table, and means to limit the movement of said longitudinally movable member in said additional standard.

3. A rigidly mounted standard, a bearing on said standard, a bar horizontally supported in said bearing and a table, one side of said table rigidly mounted on said bar, a member rigidly mounted on said first named bar, and a journal bearing adjacent to one end of said member, mechanisms on said table, and a shaft one end thereof rotatably mounted in said bearing on said member and the opposite end connected to said mechanisms in combination with an additional member loosely mounted on said first named bar, a member secured on the under side of said loosely mounted member, a standard rigidly mounted on said loosely mounted member, a longitudinally movable member in said last named standard, to support one side of said table, and a spring member interposed between said loosely mounted member and said table.

4. A standard, a bearing on said standard, a bar movable in said bearing, and a table one side thereof rigidly mounted on and supported by said bar, in combination with a base member one end thereof loosely mounted on said bar and the opposite end provided with a vertical bearing, a longitudinally movable member in said vertical bearing, means to limit the longitudinal position of said member in said bearing, and a spring seated on said loosely mounted member, said longitudinally movable member and said spring jointly supporting one side of said table, and supporting means interposed between said loosely mounted member and the machine on which said standard is secured.

5. A standard, a bearing on said standard, a horizontal member rotatably mounted on said bearing, a table one side thereof rigidly mounted on said horizontal member, and a member rigidly mounted at one end thereof on said horizontal member, said rigidly mounted member provided with a journal bearing thereon, in combination with a member loosely mounted at one end thereof on said horizontal member and at its opposite end provided with supporting means, a longitudinally movable member and a spring interposed between said loosely mounted member and said table to yieldingly support the side of the table resting thereon.

6. A standard, a bearing on said standard, a horizontally extending member supported by said bearing, a table, one side thereof supported by said horizontally extending member, and a base member, one end thereof loosely mounted on said horizontally supported member, in combination with means to support the opposite end of said base member, yielding means interposed between and connecting said base member and said table, and additional means to obtain an additional and adjusting movement of said table.

7. A standard, a bearing on said standard, a horizontally extending member supported by said bearing, a table, one side thereof supported by said horizontally extending member, and a member, one end thereof loosely mounted on said horizontally extending member, in combination with means to movably support the opposite end of said loosely mounted member, and means interposed between said loosely mounted member and said table to support the side of said table adjacent to said opposite end of said loosely mounted member.

8. A standard, a horizontally extending member supported by said standard, a member provided with a plurality of horizontal tables on the upper face thereof and one side of said member supported by said horizontally extending member, in combination with a member, one end thereof supported by said horizontally extending member, an abutment on the under side of said last named member, and a longitudinally movable member mounted on the upper side thereof to support the side of said table member adjacent thereto.

9. A horizontal bar, a table, one side thereof supported by said bar, in combination with a member, one end thereof loosely mounted on and supported by said bar, an abutment on the under side of said loosely mounted member, and a longitudinally movable member on the upper side thereof to support the side of said table adjacent thereto.

10. A standard, a horizontal member loosely mounted on said standard, a table, a member, one end thereof loosely mounted on said horizontal member, means to rigidly connect one side of said table to said horizontal member, in combination with means to support the opposite end of said loosely mounted member and adjustable means interposed between said opposite end of said loosely mounted member and the side of said table adjacent thereto.

11. A rigidly mounted standard, a bearing on said standard, a bar horizontally supported by and rockable in said bearing, a member loosely mounted on, and one end thereof supported by said bar and the opposite end movable, means interposed between said movable end of said loosely mounted member and the head of a machine to support said movable end, and an additional member, one side thereof rigidly mounted on and supported by said rockable bar, in combination with adjustable mechanism between said loosely mounted member and said rigidly mounted member.

12. A rigidly mounted standard, a bearing on said standard, a bar horizontally supported by and rockable in said bearing, a member loosely mounted on, and one end thereof supported by said bar, longitudinally adjustable means interposed between said loosely mounted member and the head of a machine, in combination with an additional member, one side thereof rigidly mounted on said rockable bar, and additional longitudinally adjustable means mounted between said loosely mounted member and said rigidly mounted member.

OTTO CULLMAN.